United States Patent
Subramanian et al.

(10) Patent No.: US 10,082,110 B2
(45) Date of Patent: Sep. 25, 2018

(54) MIXER FOR DEDICATED EXHAUST GAS RECIRCULATION SYSTEMS

(71) Applicant: Cummins Inc., Columbus, IN (US)

(72) Inventors: Rajkumar Subramanian, Columbus, IN (US); Madhuri Gandikota, Columbus, IN (US); Marten H. Dane, Columbus, IN (US); Samuel C. Geckler, Columbus, IN (US); Sudhanshu Talwar, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 456 days.

(21) Appl. No.: 14/687,169

(22) Filed: Apr. 15, 2015

(65) Prior Publication Data

US 2015/0292445 A1   Oct. 15, 2015

Related U.S. Application Data

(63) Continuation of application No. 13/555,463, filed on Jul. 23, 2012, now abandoned.

(51) Int. Cl.

| | |
|---|---|
| *F02M 26/04* | (2016.01) |
| *F02M 26/05* | (2016.01) |
| *F02M 26/19* | (2016.01) |
| *F02M 26/22* | (2016.01) |
| *F02M 26/23* | (2016.01) |
| *F02M 26/28* | (2016.01) |
| *F02M 26/35* | (2016.01) |

(Continued)

(52) U.S. Cl.
CPC ..... *F02M 25/0743* (2013.01); *F02B 29/0406* (2013.01); *F02B 37/00* (2013.01); *F02M 26/04* (2016.02); *F02M 26/05* (2016.02); *F02M 26/19* (2016.02); *F02M 26/22* (2016.02); *F02M 26/23* (2016.02); *F02M 26/28* (2016.02); *F02M 26/35* (2016.02); *F02M 26/37* (2016.02); *Y02T 10/144* (2013.01); *Y02T 10/146* (2013.01)

(58) Field of Classification Search
CPC .... F02M 25/0743; F02M 26/28; F02M 26/05; F02M 26/22; F02M 26/35; F02M 26/23; F02M 26/37; F02M 26/19; F02M 26/04–26/26; F02B 29/0406; F02B 37/00; Y02T 10/146; Y02T 10/144
USPC ....... 60/605.2, 602, 599; 123/586.17, 568.11
See application file for complete search history.

(56) References Cited

U.S. PATENT DOCUMENTS

| | | | |
|---|---|---|---|
| 4,445,487 A | 5/1984 | Higashi | |
| 5,207,714 A * | 5/1993 | Hayashi | F02M 26/18 123/568.17 |

(Continued)

FOREIGN PATENT DOCUMENTS

| | | | | |
|---|---|---|---|---|
| DE | 102006035183 | * | 1/2008 | ............. F02M 26/43 |
| WO | 2011025586 A1 | | 3/2011 | |
| WO | WO 2015090520 A1 | * | 6/2015 | ............. F02M 26/43 |

*Primary Examiner* — Thai Ba Trieu
*Assistant Examiner* — Jessica Kebea
(74) *Attorney, Agent, or Firm* — Taft Stettinius & Hollister LLP

(57) ABSTRACT

Systems, methods and techniques for exhaust gas recirculation are provided. The system includes mixing exhaust flow from at least one cylinder of an engine with air in an air intake system prior to combustion. The exhaust flow from the at least one cylinder is accumulated prior to mixing and distributed into the intake air system in a controlled manner.

10 Claims, 2 Drawing Sheets

(51) Int. Cl.
*F02M 26/37* (2016.01)
*F02B 29/04* (2006.01)
*F02B 37/00* (2006.01)
*F02M 25/07* (2006.01)

(56) References Cited

U.S. PATENT DOCUMENTS

| | | | | |
|---|---|---|---|---|
| 5,517,976 A * | 5/1996 | Bachle | ............ | F01N 3/021 |
| | | | | 123/568.11 |
| 6,286,489 B1 | 9/2001 | Bailey | | |
| 6,742,507 B2 | 6/2004 | Keefer et al. | | |
| 7,032,578 B2 * | 4/2006 | Liu | ............ | F02M 35/10118 |
| | | | | 123/568.15 |
| 7,389,770 B2 * | 6/2008 | Bertilsson | ............ | F02M 26/40 |
| | | | | 123/568.17 |
| 7,781,345 B2 | 8/2010 | Hong | | |
| 7,891,345 B2 * | 2/2011 | Pierpont | ............ | F02M 26/44 |
| | | | | 123/568.12 |
| 7,945,376 B2 * | 5/2011 | Geyer | ............ | F02M 26/39 |
| | | | | 123/568.21 |
| 8,056,340 B2 * | 11/2011 | Vaught | ............ | F02B 33/44 |
| | | | | 123/568.17 |
| 8,561,599 B2 * | 10/2013 | Gingrich | ............ | F02M 26/43 |
| | | | | 123/568.17 |
| 8,881,712 B2 * | 11/2014 | De Almeida | ............ | F02M 25/0722 |
| | | | | 123/568.15 |
| 9,410,504 B2 * | 8/2016 | Gerty | ............ | F02M 26/41 |
| 9,695,779 B2 * | 7/2017 | Wilkinson | ............ | F02M 26/19 |
| 2009/0107130 A1 * | 4/2009 | Emerick | ............ | B01F 3/02 |
| | | | | 60/324 |
| 2009/0308070 A1 | 12/2009 | Alger, II et al. | | |
| 2011/0041495 A1 * | 2/2011 | Yager | ............ | F02B 29/0437 |
| | | | | 60/605.2 |
| 2012/0216530 A1 * | 8/2012 | Flynn | ............ | F02M 25/0722 |
| | | | | 60/605.2 |
| 2016/0153404 A1 * | 6/2016 | Guidi | ............ | F02M 26/19 |
| | | | | 123/568.17 |

* cited by examiner

MIXER FOR DEDICATED EXHAUST GAS RECIRCULATION SYSTEMS

CROSS-REFERENCE TO RELATED APPLICATION

The present application is a continuation of U.S. patent application Ser. No. 13/555,463 filed on Jul. 23, 2012, which is incorporated herein by reference in its entirety.

FIELD OF THE INVENTION

The present invention relates generally to exhaust gas recirculation in internal combustion engines, and more particularly is concerned with systems, methods, and devices for exhaust gas recirculation mixing with intake air flow during the operation of an internal combustion engine.

BACKGROUND

The production of noxious nitrogen oxides ($NO_x$) by internal combustion engines which pollute the atmosphere are undesirable and in many cases are controlled by regulations established by governmental entities. Furthermore, spark ignited engines exhibit abnormal combustion phenomena called "knock", which occurs when combustion reactions in the unburned zone initiate rapid uncontrolled combustion prior to the arrival of the propagating flame front of a homogenous combustion process. One method for controlling knock includes increasing the flame propagation rate by, for example, improving the mixture homogeneity or by increasing the turbulence level induced by organized charge motion.

One method for limiting or controlling the combustion temperature of the engine and thus reduce $NO_x$ emissions has been to recirculate a portion of the exhaust gas back to the engine air intake to lower the oxygen content in the intake air. This reduces the combustion temperature of the intake charge and in turn reduces the amount of $NO_x$ formation during combustion due to lower flame temperatures. In order to recirculate exhaust gas, an exhaust gas recirculation (EGR) line that connects the exhaust manifold to the intake air supply line is provided. One EGR method to increase the flame propagation rate is to have one or more cylinders dedicated to providing EGR flow to the engine intake. When the EGR line is connected with one or more dedicated cylinders, the engine acts as a positive displacement pump to drive the EGR flow, eliminating pumping losses in transporting exhaust to the intake system and allowing a wide range of engine out nitrous oxide emissions to be achieved. Also, since the exhaust from the dedicated cylinder does not escape the engine, it is possible to have alternative combustion processes with the dedicated cylinder(s), such as running the dedicated cylinder(s) in a rich combustion condition to generate a favorable species like hydrogen. In addition, a variable geometry turbocharger is not required to drive EGR flow, facilitating meeting of target air-fuel ratios.

However, problems remain in obtaining a proper mix of the EGR flow with the intake air flow and achieving distribution of the EGR flow among the engine cylinders. Therefore, systems, methods and devices are needed to improve mixing of EGR flow from one or more engine cylinders that are dedicated to providing EGR flow.

SUMMARY

Embodiments include unique methods for mixing EGR flow with intake air for an internal combustion engine. Additional embodiments include unique systems for mixing EGR flow with intake air for an internal combustion engine. Other embodiments include unique devices for mixing EGR flow with intake air for an internal combustion engine. In one aspect, the methods, systems and devices are employed in EGR systems having EGR flow obtained from one or more cylinders dedicated to exhaust gas recirculation. Further embodiments, forms, objects, features, advantages, aspects, and benefits shall become apparent from the following description and drawings.

DETAILED DESCRIPTION

Figure 1:
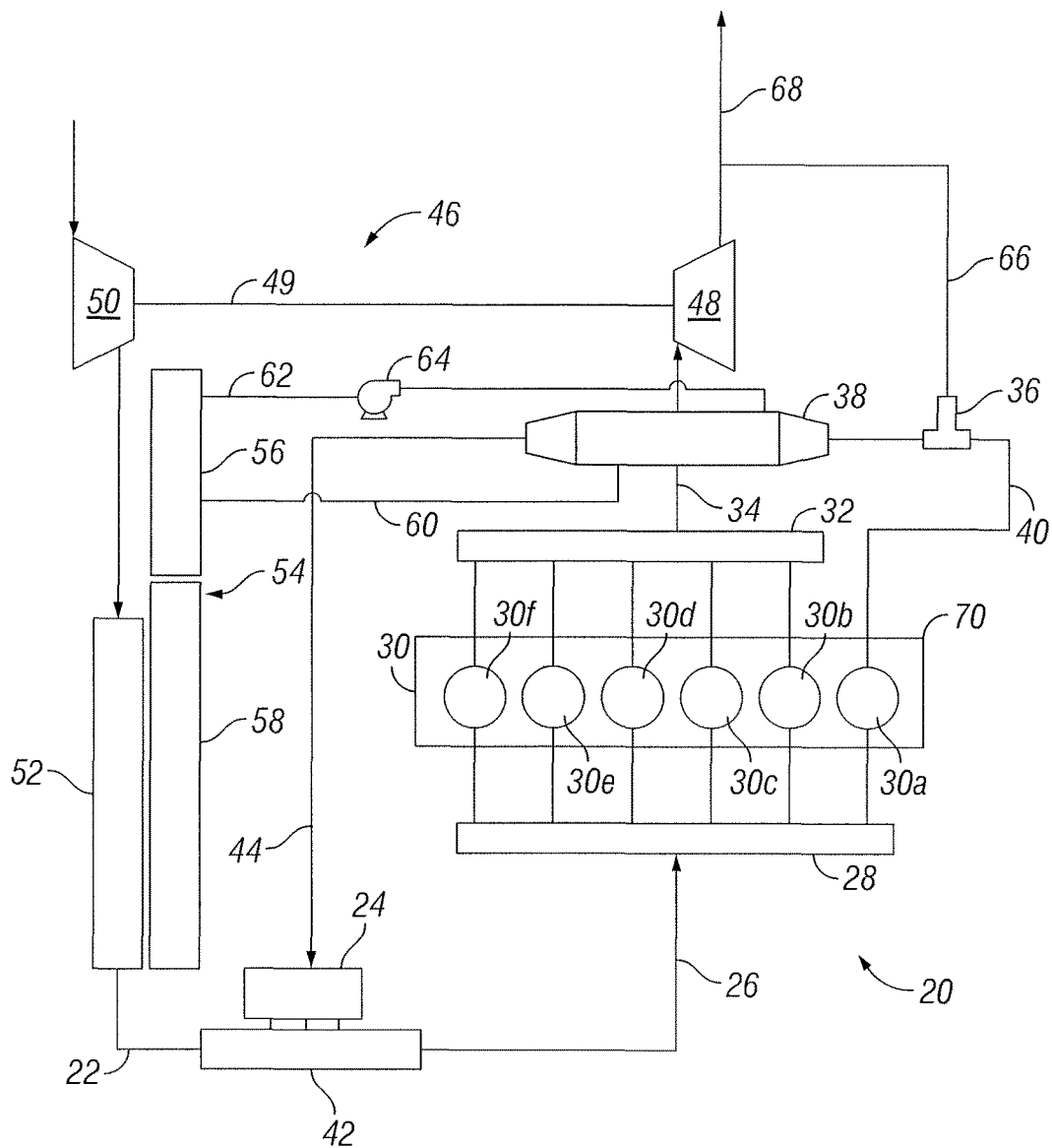
FIG. 1 is a schematic illustration of a system for mixing FOR flow with an intake flow for an internal combustion engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention illustrated therein being contemplated as would normally occur to one skilled in the art to which the invention relates.

With reference to FIG. 1, a system 20 for controlling EGR flow is illustrated in schematic form. System 20 includes an intake system with an inlet air supply conduit 22, an accumulator 24, an intake manifold supply conduit 26, and an engine intake manifold 28 connected to an engine 30. System 20 includes an exhaust system that includes an engine exhaust manifold 32, an exhaust conduit 34, a turbocharger 46, and an aftertreatment system (not shown.) System 20 also includes an EGR system with a recirculating exhaust gas supply conduit 40 that extends from and is in flow communication with at least one of the combustion chambers 30a-30f of engine 30 that is dedicated to EGR flow from a conduit that is separate from exhaust flow conduit 34. The EGR system also includes an EGR cooler 38 and an EGR flow valve 36 allows the flow of exhaust from the dedicated cylinder/combustion chamber to EGR cooler 38 to be varied. EGR flow continues from EGR cooler 38 through an EGR conduit 44 to accumulator 24 where EGR flow is temporarily stored and then released for distribution and mixing with charge flow in air supply conduit 22 at a mixing location 42. Accumulator 24 includes at least one inlet to receive EGR flow from EGR conduit 44 and a plurality of outlets that connects accumulator 24 with mixing location 42.

EGR conduit 44 is flow coupled to mixing location 42 through accumulator 24 and the inlet air supply is flow coupled to mixing location 42 through inlet air supply conduit 22. A charge flow is created by combining inlet air and recirculated exhaust gas at mixing location 42. The charge flow created at mixing location 42 is flow coupled to engine intake manifold 28 through intake manifold supply conduit 26. At least one of the cylinders 30a of engine 30 is flow coupled to EGR cooler 38 through recirculating exhaust gas supply conduit 40 and EGR valve 36, and EGR cooler 38 is flow coupled to accumulator 24 through EGR conduit 44. EGR cooler 38 may further be connected to a radiator system 54 including a low temperature radiator 56 and a high temperature radiator 58. A coolant return line 60 extends from EGR cooler 38 to radiator system 54 and a coolant supply line 62 supplies coolant from radiator system 54 to EGR cooler 38. Coolant supply line 62 may include a pump 64 to provide circulation of coolant flow. In another embodiment, the coolant system may utilize only one radiator, such as radiator 58.

In one embodiment, exhaust conduit 34 is flowed coupled to exhaust manifold 32, and may also include one or more intermediate flow passages, conduits or other structures. Exhaust conduit 34 extends to a turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to a compressor 50 flow coupled to inlet air supply conduit 22. Inlet air supply conduit 22 may include a charge air cooler 52 downstream from compressor 50 and upstream from mixing location 42. In another embodiment, inlet air supply conduit 22 may include a charge air cooler 52 downstream from mixing location 42. The components illustrated in FIG. 1 are not exclusive of all components and/or arrangements that may be included in system 20. Furthermore, one or more of the illustrated components in system 20 may be omitted.

In operation of system 20, fresh air is supplied through inlet air supply conduit 22. The supplied air can be filtered, unfiltered, and/or conditioned in any known manner. The air supply system may include components configured to introduce charged air into engine 30, and may include an induction valve (not shown), one or more compressors 50, and charge air cooler 52. The induction valve may be connected upstream or downstream of compressor 50 via a fluid passage and configured to regulate a flow of atmospheric air to engine 30. Compressor 50 may be a fixed or variable geometry compressor configured to receive air from the induction valve and compress the air to a predetermined pressure level before the air enters engine 30. Charge air cooler 52 may be disposed within inlet air supply conduit 22 between engine 30 and compressor 50, and embody, for example, an air-to-air heat exchanger, an air-to-liquid heat exchanger, or a combination of both to facilitate the transfer of thermal energy to or from the compressed air directed into engine 30.

In one embodiment, ambient air is pressurized with compressor 50 and sent through charge air cooler 52 before delivery to mixing location 42. EGR valve 36 is operable to proportionally control recirculation of all or a portion of exhaust gas from at least one of the cylinders 30a-30f of engine 30 to accumulator 24. EGR valve 36 may be actuatable to control the proportion of exhaust gas that is recirculated, or may simply be an on/off type valve with proportion control provided exclusively by accumulator 24. In embodiments in which only a portion of exhaust gas is recirculated, an EGR flow measurement sensor or intake oxygen measurement sensor may be provided to estimate the amount of EGR flow that is inducted into cylinders 30a-30f. In still other embodiments, there is no EGR valve 36 and EGR flow is provided continuously during engine operation. The EGR flow through accumulator 24 is distributed and mixed with inlet air received from inlet air supply conduit 22 at mixing location 42. The air-exhaust gas mixture is then supplied to engine 30 through engine intake manifold 28 and intake manifold supply conduit 26.

Exhaust gas which is not recirculated through EGR valve 36 continues through an exhaust conduit 66 to an outlet conduit 68 downstream of turbine 44 and then, along with exhaust gas from exhaust conduit 34, is outlet through an aftertreatment system (not shown) to a tail pipe or other structure to the atmosphere. The exhaust system along outlet conduit 68 may include components configured to direct exhaust from engine 30 to the atmosphere. Specifically, the exhaust system may include, for example, oxidation devices (DOC), particulate removing devices (DPF, CDPF), constituent absorbers or reducers (SCR, AMOX, LNT), three-way catalysts for stoichiometric spark ignited engines, attenuation devices (mufflers), controllers, etc., if desired.

In operation, engine 30 produces a non-EGR exhaust stream into exhaust conduit 34 and receives a charge flow from intake manifold supply conduit 26 comprising an intake air stream from inlet air supply conduit 22 mixed with an EGR stream from EGR conduit 44. The engine 30 is fluidly coupled to intake manifold 28 and exhaust manifold 32, and the EGR stream passes from the one or more dedicated cylinder(s) through EGR valve 36. The recirculating exhaust gas supply conduit 40 is illustrated as exiting the dedicated cylinder 30a, but may include one or more branch lines to receive exhaust from one or more of the other cylinders 30b-30f dedicated to providing recirculating exhaust gas flow.

In one embodiment, engine 30 is a turbocharged diesel engine. In still other embodiments, engine 30 is a spark-ignited engine. It should be understood that a variety of other types of engines and combustion devices are contemplated by additional embodiments including non-turbocharged diesel engines as well as engines which combust fuels other than diesel. Engine 30 may include an engine block 70 that at least partially defines a plurality of cylinders 30a-30f. A piston (not shown) may be slidably disposed within each cylinder 30a-30f to reciprocate between a top-dead-center position and a bottom-dead-center position, and a cylinder head (not shown) may be associated with each cylinder 30a-30f. Cylinder 30a-30f, the piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 30a-30f moves through an intake stroke, a compression stroke, a combustion or power stroke, and an exhaust stroke. Thus, during each complete cycle for the depicted six cylinder engine, there are six strokes during which air is drawn into individual combustion chambers from intake manifold supply conduit 26, five strokes during which exhaust is expelled from individual cylinders 30b-30f to exhaust conduit 34, and one exhaust stroke during which exhaust gas is expelled from cylinder 30a to recirculating exhaust gas supply conduit 40. These strokes correspond with pulsations of air and exhaust within the respective systems.

Figure 2:
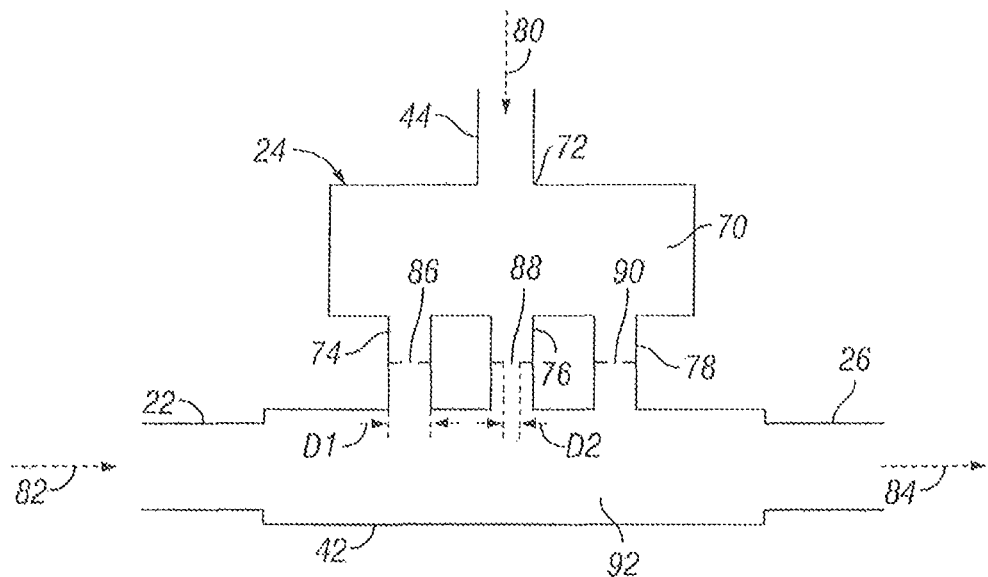
FIG. 2 is a schematic illustration of an accumulator in the system of FIG. 1 that connects an EGR system to an intake system.
Figure 3:
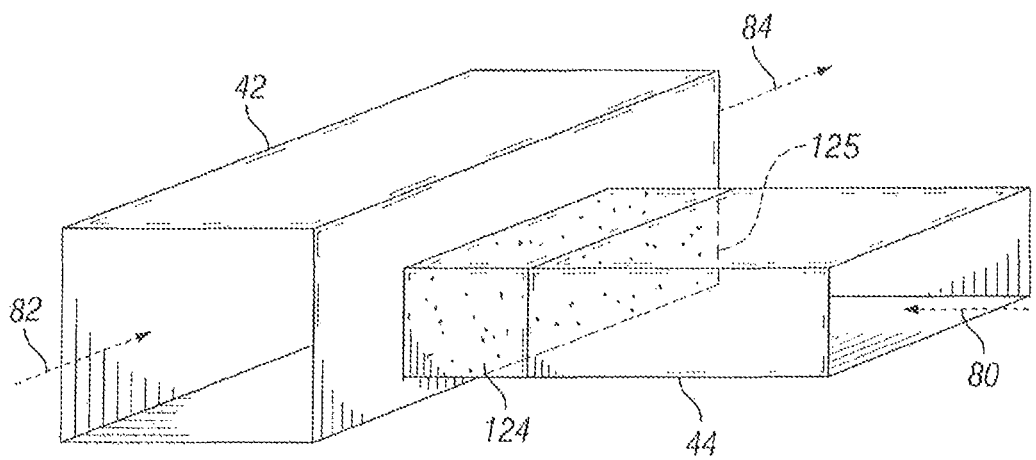
FIG. 3 is a schematic illustration of another embodiment accumulator connecting an EGR system to an intake system.

As can be seen in FIG. 2, one embodiment of accumulator 24 is shown. Accumulator 24 includes a housing that defines a storage volume 70 having an inlet 72 fluidly connected to EGR cooler 38 with EGR conduit 44 to receive EGR flow

80. Accumulator 24 also includes a plurality of outlets 74, 76, 78 fluid fluidly connected to mixing location 42, which also receives an inlet air flow 82 from inlet air conduit 22. Outlets 74, 76, 78 each include an orifice 86, 88, 90, respectively, to admit a controlled amount of EGR flow 80 into mixing location 42 at spaced locations along the length of mixing portion 42. EGR flow 80 mixes with inlet air flow 82 to provide a charge flow 84 in which EGR flow is combined with inlet air flow and provided to intake manifold 28 from intake manifold supply conduit 26.

Outlets 74, 76, 78 each include a respective length of pipe or conduit that connects storage volume 70 to mixing location 42. Each pipe includes a first internal diameter D1 and an internal orifice 86, 88, 90, respectively, having a second diameter D2 less than first diameter D1. The length of pipe, along with the first and second diameters, are sized to provide a desired flow rate of EGR flow 80 from storage volume 70 into mixing location 42. Outlets 74, 76, 78 and the EGR flow therethrough are arranged in perpendicular orientation to the direction of inlet air flow 82 and parallel to the direction of EGR flow 80 such that the pressures and the flow rates of exhaust passing through orifices 86, 88, 90 may be maintained substantially equal. Each of outlets 74, 76, 78 may direct parallel flows of EGR flow 80 into a mixing chamber 92 defined by mixing location 42 in a direction substantially orthogonal to or, in other embodiments, the same, opposing, or different direction as the inlet air flow 82 through fluid mixing chamber 92.

As can also be seen in FIG., outlets 74, 76, 78 may be separated from each other along a length direction of mixing location 42 such that EGR flow 80 is substantially evenly distributed within the charge flow to each cylinder 30a-30f during operation of engine 30. As described above with respect to a six cylinder engine, during a full engine cycle, six pulses of air may be drawn from intake manifold supply conduit 26 by cylinders 30a-30f, and five pulses of exhaust may be directed from cylinders 30b-30f into exhaust conduit 34 and one pulse of exhaust may be directed into EGR conduit 44 from cylinder 30a. Volume 70 accumulates EGR flow 80 therein so that a continuous supply of exhaust gas is available for admission into mixing chamber 92 at mixing location 42 through outlets 74, 76, 78. To provide substantially equal distribution of the EGR flow 80 relative to inlet air flow 82, the pulses of recirculated exhaust gas should be substantially equally interspersed within the pulses of air.

In the embodiment of FIG. 2, the volume 70 is sized as a portion or fraction of the engine total displacement, which is dependent on the number of cylinders acting as dedicated cylinders to EGR flow 80. In the example of FIG. 2, the total number of cylinders 30b-30f included within engine 30 contributing to engine displacement is five, the number of cylinders 30a contributing exhaust to EGR flow 80 is one, and the number of outlets is three. Thus, the volume 70 is sized to accumulate sufficient recirculated exhaust gas from cylinder 30a to provide a continuous supply of EGR flow for the air pulses of the six cylinders 30a-30f. In this example, each pulse of exhaust from the single contributing cylinder 30a is accumulated in volume 70 and subsequently divided by orifices 86, 88, 90 of outlets 74, 76, 78 into three smaller pulses that are dispersed between or within each pulse of air drawn into cylinders 30a-30f. Since the storage volume 70 provides a constant source of recirculated exhaust gas, EGR flow 80 is contributed to each pulse of air drawn into the respective cylinders 30a-30f even if dedicated cylinder 30a is not generating an exhaust pulse.

FIG, 3 illustrates another embodiment accumulator 124 connected at an outlet of EGR conduit 44 and at an inlet to mixing chamber 92 of mixing portion 42. Accumulator 124 includes a storage volume that is comprised of a porous media 125, such as the media used in typical catalyst systems. In another embodiment, an EGR accumulator and storage volume can be provided upstream of the porous media in EGR conduit 44. The porous media 125 of accumulator 124 disperses EGR flow 80 through the media to provide a spatial flow distribution through the small holes of the porous media 125 and into the inlet of mixing chamber 92 along the length of mixing location 42, i,e along the direction of inlet air flow 82. The use of the porous media 125 to outlet EGR flow into mixing portion 42 allows the orifices of accumulator 124 to be eliminated, reducing pressure drop losses. Furthermore, the catalyst of accumulator 124 increases the hydrogen content of the EGR flow 80 by utilizing the water gas shift reaction which produces hydrogen from the water in the recirculated exhaust gas. Since the small pore size of the porous media 125 restricts EGR flow to resolve the pulsed flow characteristics of the EGR flow from the dedicated cylinders 30a, a constant supply of recirculated exhaust gas is provided to mixing chamber 92 upon the air pulse of the respective cylinder 30a-30f.

The disclosed EGR systems may be implemented into any engine or power system application where EGR is utilized. The disclosed EGR system provides improved distribution of recirculated exhaust gas in applications where fewer than all of the engine system's cylinders contribute exhaust for recirculation. Specifically, the disclosed EGR system in one embodiment stores EGR flow from each exhaust pulse of the engine's contributing cylinder(s) to provide a constant supply of EGR flow that is divided into multiple EGR flows that are substantially equally distributed within intake air that is subsequently drawn into the engine and combusted. The disclosed EGR system in another embodiment distributes EGR flow from each exhaust pulse of the engine's contributing cylinder(s) through a porous medium to provide an EGR flow that is distributed along a length of a mixing chamber for mixing with combustion air that is subsequently drawn into the engine and combusted.

As is evident from the figures and text presented above, a variety of aspects are contemplated. According to one aspect, a method comprises: operating an engine having a plurality of cylinders; directing air into the plurality of cylinders from an air intake system; combusting a mixture of air and fuel within the plurality of cylinders to generate a power output and a flow of exhaust; directing a first portion of the flow of the exhaust to an aftertreatment system; directing a second portion of the flow of the exhaust to an exhaust gas recirculation system to mix with the air in the air intake system prior to combustion, wherein the second portion of the flow of exhaust is created by combustion in at least one of the plurality of cylinders dedicated to providing the second portion of the flow of the exhaust; and prior to mixing with the air in the air intake system, storing the second portion of the flow of the exhaust in an accumulator in the exhaust gas recirculation system, the accumulator extending between an inlet to the accumulator and a plurality of outlets from the accumulator into the air intake system, wherein the accumulator provides a stored supply of recirculated exhaust gas to the air intake system in response to air pulsation by the plurality of cylinders during operation of the engine.

In one embodiment, the method includes providing a plurality of flows of the second portion of the exhaust from the plurality of outlets of the accumulator into the air intake system. In one refinement of this embodiment, the method includes spacing the plurality of flows of the second portion of the exhaust at locations spaced apart from each other along the air intake system. In another refinement of this embodiment, the plurality of flows of the second portion of the exhaust extend from the accumulator substantially orthogonally to a flow of the air in the air intake system.

In another embodiment of the method, the accumulator includes a storage volume between the inlet and the plurality of outlets, and the storage volume is sized as a function of a total number of the plurality of cylinders contributing to the second portion of the flow of exhaust to mix with air. In a further embodiment, the method comprises directing the first portion of the flow of the exhaust to a turbocharger and directing the second portion of the flow of the exhaust from the at least one of the plurality of cylinders only to the accumulator. In another embodiment, the accumulator is comprised of a porous media defining the plurality of outlets that are spaced along a mixing chamber of the intake system where the outlets are connected to the intake system.

According to another aspect, a system comprises an engine including a plurality of cylinders, an intake passage configured to direct combustion air to all of the plurality of cylinders, an exhaust passage configured to receive exhaust from a first portion of the plurality of cylinders and direct the exhaust from the first portion to an aftertreatment system, and an exhaust gas recirculation system configured to receive exhaust from a second portion of the plurality of cylinders and direct the exhaust from the second portion to the intake passage. The exhaust gas recirculation system includes an accumulator having an inlet for receiving the exhaust gas from the second portion of the plurality of cylinders, a plurality of outlets along the intake passage that directly connect the accumulator to the intake passage, and a storage volume between the inlet and the plurality of outlets that is sized as a function of the number of cylinders comprising the second portion of the plurality of cylinders.

According to one embodiment, the second portion of the plurality of cylinders are dedicated to providing exhaust to the exhaust gas recirculation system. In one refinement of this embodiment, the first portion of the plurality of cylinders are dedicated to providing exhaust to a turbocharger system. In another embodiment of the system, each of the plurality of outlets is fluidly connected with a mixing chamber of the intake passage. In one refinement of this embodiment, each of the plurality of outlets includes a length of conduit extending from the storage volume to the mixing chamber, and each of the conduits defines an inner dimension and includes an orifice having an opening dimension that is less than the inner dimension. In another embodiment of the system, the accumulator receives exhaust from a cooler in the exhaust gas recirculation system.

According to another embodiment, the second portion of the plurality of cylinders consists of one cylinder. In one refinement of this embodiment, the first portion of the plurality of cylinders includes at least two cylinders. In another embodiment, the system includes an exhaust manifold fluidly communicating the first group of the plurality of cylinders with a turbocharger. In another embodiment, the system includes a cooler located within the exhaust gas recirculation system and a valve located upstream of the cooler to regulate exhaust flow from the second portion of the plurality of cylinders through the exhaust gas recirculation system. In one refinement of this embodiment, the valve is connected to the exhaust passage downstream of a turbocharger in the exhaust passage. In a further embodiment, the system comprises a porous media configured to spatially distribute the exhaust flow from the second portion of the plurality of cylinders, and the porous media defines the plurality of outlets along the intake passage. In one refinement of this embodiment, the storage volume is upstream of the, porous media in the EGR conduit.

According to another aspect, a system comprises a combustion engine having a first group of cylinders and at least one second group of at least one cylinder, an exhaust manifold configured to receive exhaust from the first group of cylinders, a turbocharger configured to receive exhaust only from the exhaust manifold, an intake system configured to direct combustion air to the first and second groups of cylinders, an exhaust gas recirculation system configured to receive exhaust from only the second group of cylinders, and an accumulator connecting the exhaust gas recirculation system to the intake system. The accumulator includes an inlet and a plurality of separate exhaust outlets in flow communication with the intake system. The accumulator is configured to accumulate exhaust in the exhaust gas recirculation system and provide a constant supply of recirculated exhaust gas to the intake system in response to air pulsation of the first and second groups of cylinders during operation of the combustion engine.

In one embodiment of the system, the accumulator defines a storage volume between the inlet and the plurality of outlets, and the storage volume is a function of a total number of cylinders in the second group. In another embodiment, the second group of cylinders consists of a single cylinder. In one refinement of this embodiment, the first group of cylinders includes at least five cylinders. In other refinements, the first group of cylinders includes at least two cylinders, and the second group of cylinders includes at least one cylinder. In still other refinements, the first group of cylinders includes at least two cylinders and the second group of cylinders includes at least two cylinders. In another embodiment, the storage volume is comprised of a porous media and the porous media defines the plurality of outlets opening into a mixing chamber of the intake system. In a further embodiment, the system further includes a cooler situated to cool exhaust flowing through the exhaust gas recirculation system and a valve located upstream of the cooler to regulate the flow of exhaust through the exhaust gas recirculation system, wherein the accumulator is downstream of and receives exhaust from the cooler. In one refinement of this embodiment, the system includes an outlet conduit extending from the turbocharger to an aftertreatment system and the valve is connected to the outlet conduit downstream of the turbocharger.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an engine having a plurality of cylinders;
directing air into the plurality of cylinders from an air intake system;
combusting a mixture of air and fuel within the plurality of cylinders to generate a power output and a flow of exhaust;
directing a first portion of the flow of the exhaust to an aftertreatment system;
directing a second portion of the flow of the exhaust to an exhaust gas recirculation system to mix with the air in the air intake system prior to combustion, wherein the second portion of the flow of exhaust includes a plurality of pulses of exhaust created by combustion in at least one of the plurality of cylinders dedicated to providing the second portion of the flow of the exhaust;
storing each of the plurality of pulses of exhaust in a storage volume of an accumulator in the exhaust gas recirculation system, the storage volume of the accumulator extending between an inlet to the accumulator and a plurality of outlets that connect the accumulator to the air intake system, the plurality of outlets restricting a flow of the exhaust from the accumulator into the air intake system so that the plurality of pulses of exhaust is accumulated in the storage volume to provide an accumulated source of stored recirculated exhaust gas; and
dispersing a part of the accumulated pulses of exhaust through the plurality of outlets within each pulse of air drawn into each of the plurality of cylinders from the intake system; and
wherein the plurality of outlets are defined by pores of a porous catalyst media configured to increase a hydrogen content of the part of the accumulated pulse of exhaust dispersed to the intake system.

2. The method of claim 1, wherein the storage volume is sized as a function of a first number of the plurality of cylinders contributing to engine displacement, and the first number of the plurality of cylinders contributing to engine displacement are the at least one of the plurality of cylinders dedicated to providing the second portion of the flow of the exhaust.

3. The. method of claim 1, further comprising:
directing the first portion of the flow of the exhaust to a turbocharger; and
directing the second portion of the flow of the exhaust from the at least one of the plurality of cylinders only to the accumulator.

4. A system, comprising:
a combustion engine having a first group of cylinders and a second group of at least one cylinder;
an exhaust manifold configured to receive exhaust from the first group of cylinders and provide the exhaust received from the first group of cylinders to an outlet conduit;
an intake system configured to direct combustion air to the first and second groups of cylinders;
an exhaust gas recirculation system configured to receive exhaust from only the at least one cylinder of the second group of cylinders; and
an accumulator connecting the exhaust gas recirculation system to the intake system, the accumulator including an inlet and a plurality of separate exhaust outlets in flow communication with the intake system, wherein the accumulator includes a storage volume between the inlet and the plurality of separate exhaust outlets configured to store each of a plurality of pulses of exhaust created by the at least one cylinder of the second group in the exhaust gas recirculation system, wherein the plurality of separate exhaust outlets are configured to restrict a flow of the stored pulses of exhaust from the accumulator into the Intake system so that a part of the plurality of pulses of exhaust stored in the accumulator is dispersed within each pulse of air drawn into the first and second groups of cylinders during operation of the combustion engine; and
the storage volume is comprised of a porous catalyst media and the porous catalyst media disperses the exhaust stored in the accumulator into a mixing chamber of the intake system while increasing a hydrogen content of the exhaust flowing through the porous catalyst media.

5. The system of claim 4, wherein the storage volume is a function of a first number of cylinders contributing to engine displacement, and the first number of the plurality of cylinders contributing to the engine displacement are the at least one of the plurality of cylinders dedicated to providing the second portion of the flow of the exhaust.

6. The system of claim 4, wherein the second group of cylinders consists of a single cylinder.

7. The system of claim 6, wherein the first group of cylinders includes at least two cylinders.

8. The system of claim 4, further comprising:
a cooler situated to cool exhaust flowing through the exhaust gas recirculation system; and
a valve located upstream of the cooler to regulate the flow of exhaust through the exhaust gas recirculation system, wherein the accumulator is downstream of and receives exhaust from the cooler.

9. The system of claim 8, further comprising an outlet conduit extending from the turbocharger to an aftertreatment system, wherein the valve is connected to the outlet conduit downstream of the turbocharger.

10. The system of claim 4, further comprising a turbocharger configured to receive exhaust only from the exhaust manifold.

* * * * *